Dec. 14, 1965     C. G. HART     3,222,850
FILTER

Filed May 11, 1961     3 Sheets-Sheet 1

INVENTOR.
CHARLES G. HART
BY J. P. Keiper
ATTORNEY

Dec. 14, 1965            C. G. HART            3,222,850

FILTER

Filed May 11, 1961            3 Sheets-Sheet 2

INVENTOR.
CHARLES·G·HART

BY *[signature]*

ATTORNEY

Dec. 14, 1965  C. G. HART  3,222,850
FILTER

Filed May 11, 1961  3 Sheets-Sheet 3

*INVENTOR.*
CHARLES G. HART
BY
ATTORNEY.

United States Patent Office 3,222,850
Patented Dec. 14, 1965

3,222,850
FILTER
Charles G. Hart, Syracuse, N.Y., assignor to Cambridge Filter Corporation, Syracuse, N.Y., a corporation of New York
Filed May 11, 1961, Ser. No. 109,364
1 Claim. (Cl. 55—500)

This invention relates to space filters, and more particularly to filters employing filter medium arranged in pleated formation to provide an extended filter area.

In Patent #2,907,408, issued October 6, 1959, there is shown a commercial form of filter wherein pleated filter medium is employed in the form of low cost replaceable cartridges, which cooperate with a permanent grid like support structure. While the support structure results in initial installation expense, such structures have proven economical over the indefinite periods of use to which they are adapted. The present invention is directed to a unitary filter structure adapted to serve the same purpose as the combined support structure and cartridge referred to, which unitary filter structure is self supporting, and which is sufficiently low in cost to avoid the necessity for the initial expense of a supporting grid structure.

In filters employing pleated filter medium, it is the practice to form the pleats as close and as deep as possible to provide a maximum of filter area in a minimum of space. In such construction it is necessary to provide, as in Patent 2,907,408, lateral support for the flanks of the filter medium to prevent distortion under differential pressure that might tend to collapse adjacent flanks into contact with one another and thus lessen the efficiency.

The present invention is directed to such a filter in which the frame and supporting means are unitary and are extremely economical to manufacture and which are readily assembled whereby the entire unit cost may compare sufficiently favorably with the cartridge formerly used in conjunction with a permanent supporting frame as to avoid the initial expense of the latter. The invention contemplates the utilization of light weight framing material such as polystyrene foam, and injection molded polystyrene comb-like members for providing the lateral pleat support against differential pressure referred to. The entire unit is so adapted as to be readily assembled at a minimum of expense, into a permanent unit which may be discarded and replaced when the filter efficiency becomes lowered from use.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings wherein the reference characters indicate like parts:

Figure 2:
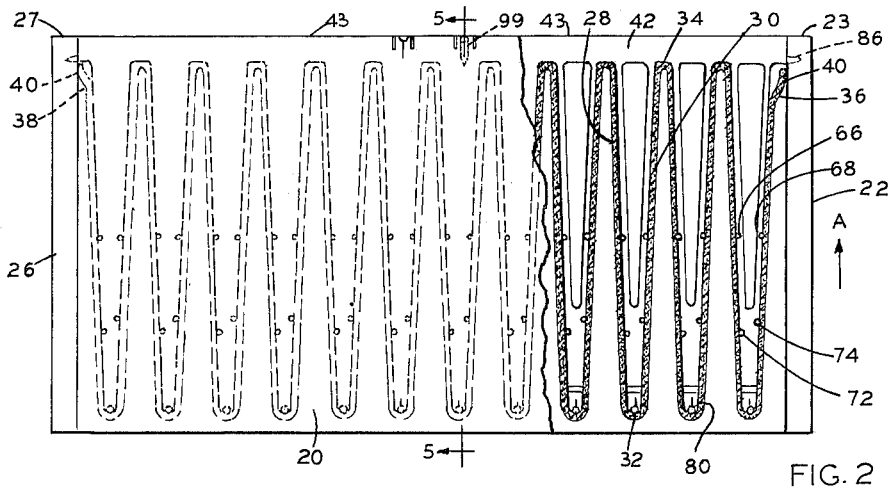
FIGURE 2 is a top plan view of the filter unit with parts broken away to show the supporting structure.
Figure 1:
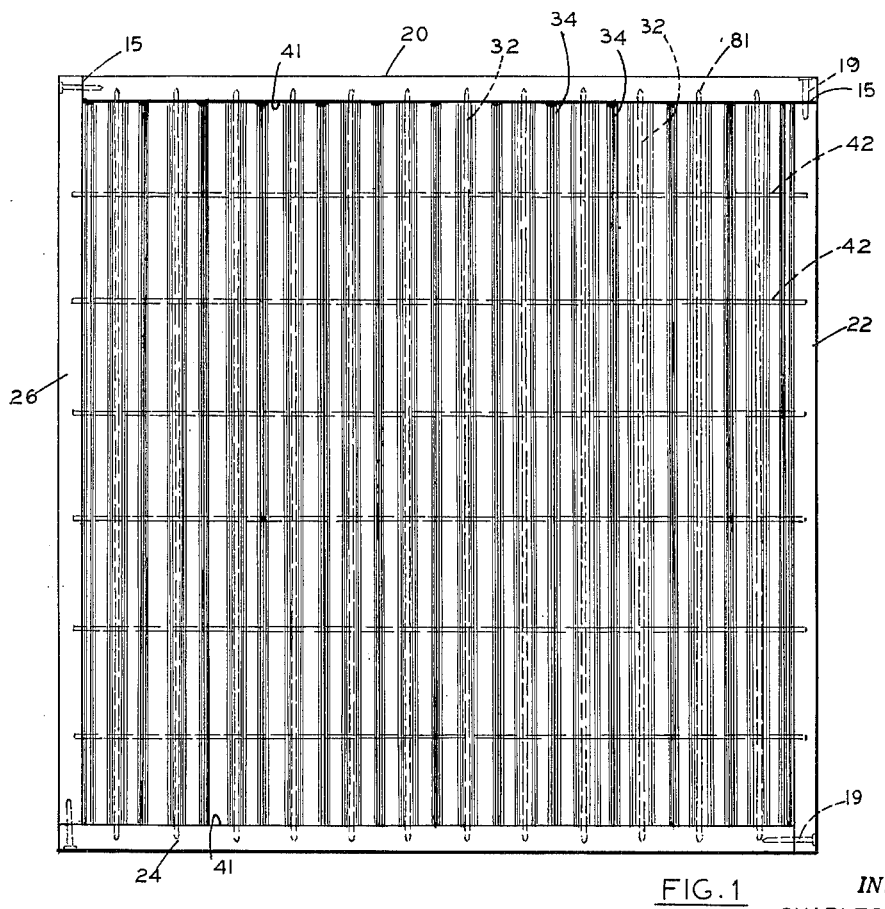
FIGURE 1 is an elevational view of the filter unit taken from the upstream side thereof.

Referring to the drawings, in FIGURES 1 and 2 there is shown a filter unit having an outer frame formed of rigid thick slabs of polystyrene foam or the like, the frame comprising upper and lower, and side members 20, 24, 22 and 26 respectively. Within the frame is disposed a sheet of filter medium formed of fine glass fibers or other suitable filter material, the sheet being formed into a series of pleats, each having planar flanks 28 and 30, between the alternate folds 32 and 34. The ends 36 and 38 of the sheet of pleated filter medium are adhesively secured to the side walls 26 and 22, as indicated for example at 40, and the pleats are supported upon a series of comb like members 42 disposed at spaced intervals in parallel relation within the frame from top to bottom.

Figure 3:
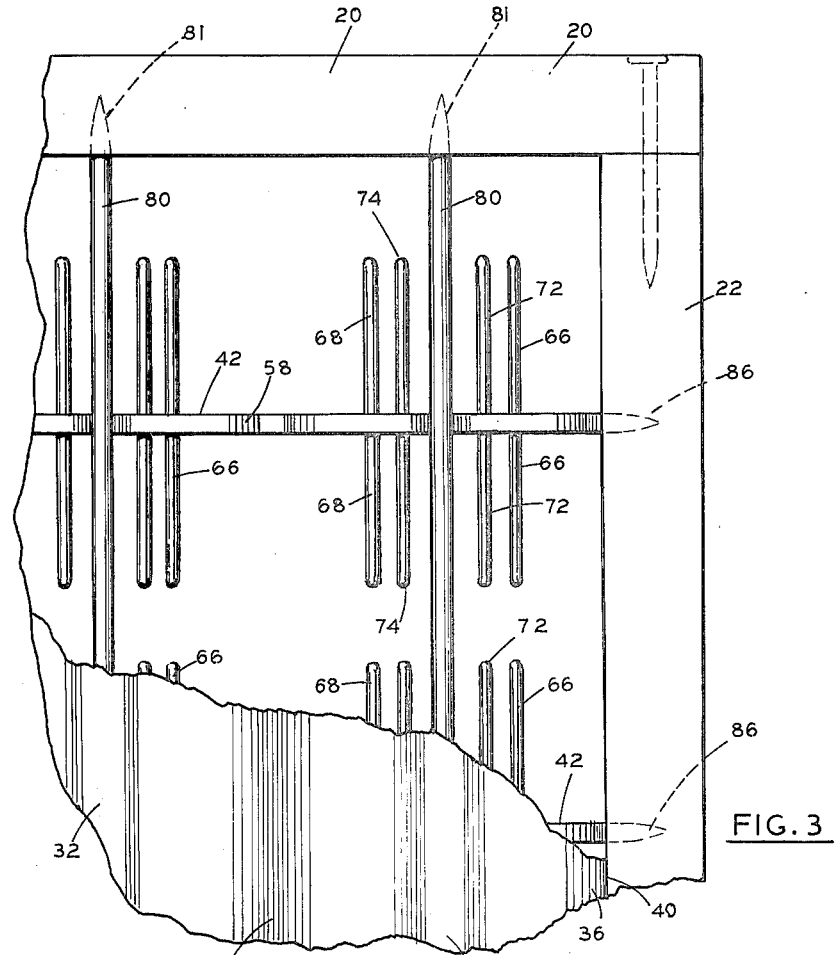
FIGURE 3 is an enlarged fragmentary view of a corner of the unit shown in FIGURE 1, with the pleated filter material removed.
Figure 4:
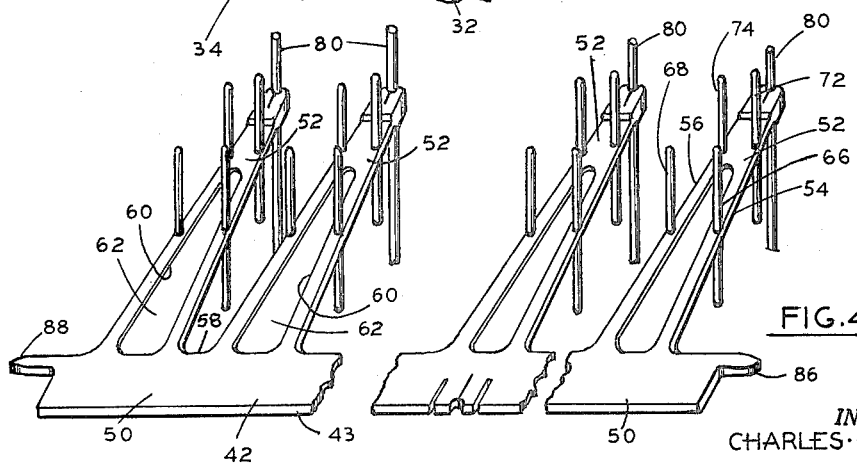
FIGURE 4 is a perspective view of an injection molded support comb, with the portions broken away.

Each of the combs comprises an integral molded member of plastic such as polystyrene formed as shown in FIGURES 3 and 4. Each individual comb comprises a back bone as indicated at 50, from which extend a plurality of support teeth of uniform construction and spacing as at 52. The teeth have inclined edges 54 and 56, and rounded inter-connecting surfaces 58, and each tooth is provided with recesses 60, adapted to form a thin web 62 to reduce the weight. The teeth of each comb are provided with long rounded section spines such as 66, 68, 72 and 74, extending in opposite directions from each tooth, the spines being formed tangent to the edges 54 and 56 and being spaced therealong at such frequency as may be required to provide support to the pleat flanks of the filter medium pleats. Adjacent tines such as 72 and 74 may be staggered somewhat to lessen the stress on the tooth. All spines are of uniform length, and extend in opposite directions. The combs are disposed in parallel relation within the frame, with the ends of the spines of the adjacent combs spaced from one another as far apart as may be permissible, while providing adequate support to the flanks 28 and 30 of the filter medium.

Figure 7:
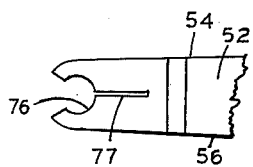
FIGURE 7 is an enlarged view of the tip end of a tine of the combs.
Figure 6:
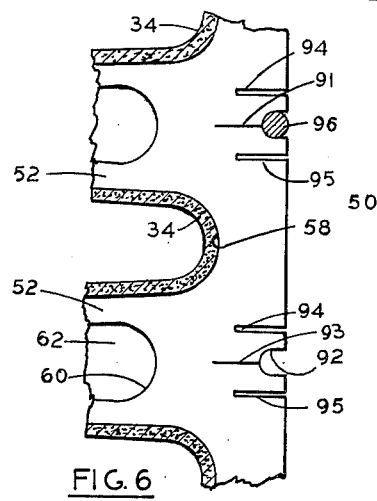
FIGURE 6 is an enlarged fragmentary view of the center portion of a comb backbone.

The tip ends of the teeth are provided with half round recesses 76 with slits 77 (see FIGURE 7) to provide for resiliently receiving and securing rods 80 of wood or the like which extend transversely of the combs from the top wall 20 to bottom wall 24. Such rods 80 are pointed at their ends and are driven into and permanently embedded in the top and bottom walls 20 and 24 of the frame as at 81. The backbone of each comb is provided with pointed projections 86 and 88 adapted to pierce and be driven into the side members 26 and 22.

Figure 5:
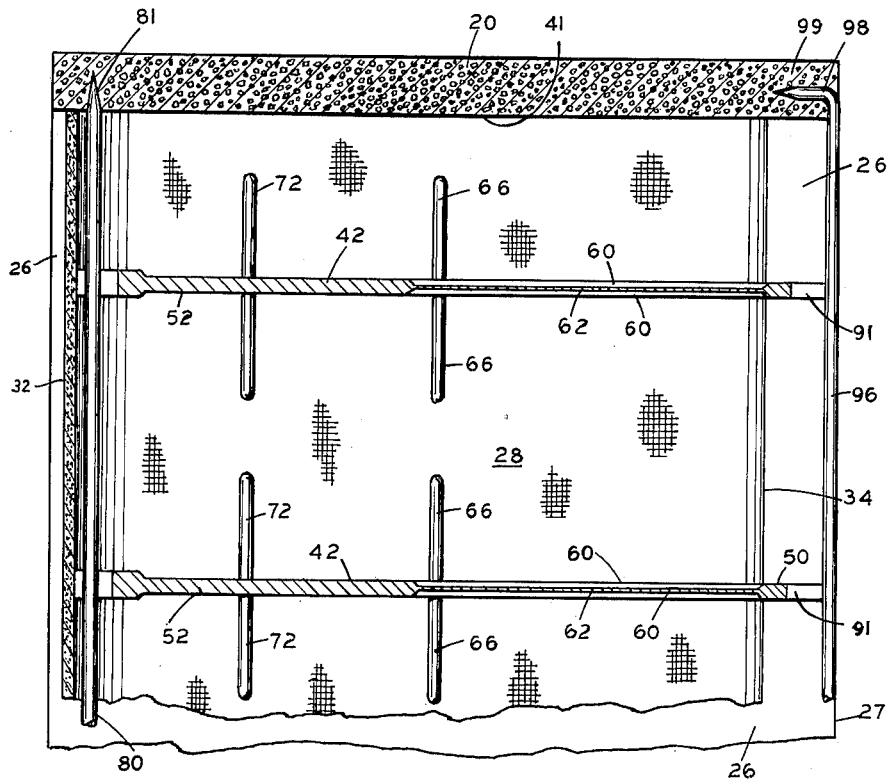
FIGURE 5 is an enlarged fragmentary vertical sectional view taken substantially on the line 5—5 of FIGURE 2.

The backbone 50 of the combs is provided with two centrally located half round recesses 90 and 92 aligned with the two center teeth, and such recesses are provided with a slit as at 91 and 93, and slits 94 and 95 on either side thereof whereby to provide spaced resilient grip fingers for securing a rod 96 extending from the upper end of the filter frame, to the lower end 24, the rod having right angle points 98 at its opposite ends for embedding in the ends 20 and 24 in the manner shown at 99 (FIGURE 5). Provision of two recesses 90 and 92, where an even number of teeth are employed permits the comb members to be reversed while still affording provision for the rod 98 to be received in one or the other set of the aligned recesses 90 and 92 of each of the combs from top to bottom, whereby to provide support to the back bone of each comb. Should there be an odd number of teeth, but one such recess would be required.

Assembly of the filter unit as shown is preferably effected by pleating a sheet of filter medium of proper length, on a pleating machine such as shown in copending application #13,318, filed March 7, 1960, now Patent 3,138,077 or on a frame or form, the individual pleats being supported from one side upon pleating leaves or other uniformly spaced supporting members of a form. While the medium is so supported, a plurality of combs 42 uniformly spaced in parallel relation, and provided with transverse tie rods 80 disposed across and gripped in the end recesses 76 are inserted into the pleats from the reverse or down stream side. The ends of the filter sheet are provided with adhesive, as well as the opposite side sinuous edges of the pleats thereof, following which the frame members are positioned around the medium, supporting combs and tie rods. The points 86 and 88 of the combs, and the pointed ends 81 of the tie rods 80 are driven or projected into the side members and top and bottom frame members respectively, and the frame members are closed in around the pleated filter at the same time, the outer edges 43 of the combs being disposed approximately flush with the edges 23 and 27 of the side members 22 and 26. The adhesive applied to the filter medium edges is thus caused to adhere to the top and bottom members as at 41, and the ends caused to adhere to the side members 22 and 26 as at 40 and the frame side members at their adjoining edges, as at 15, may be adhesively secured and further fastened by means such as nails 19 driven through the respective members as indicated. The assembly thus provides a rigid frame with the medium adhesively secured to the inner walls thereof continuously along the entire perimeter of the filter sheet, to provide a seal against leakage of air, and the comb members and support rods are rigidly supported from the respective frame members by projection of their respective pointed ends 81 and 86 and 88 into the respective frame members. Thereafter the support rod 96 may be yieldingly disposed in each of a series of aligned resilient open recesses 90 or 92 of all of the comb members, and the pointed ends 98 thereof driven into the top and bottom members in the manner shown in 99.

For illustrative purposes the filter illustrated has a depth of about one half of the frame size. In practice, the filter media sheet employed may be approximately doubled in length by doubling the depth of the pleats, and proportionately increasing the length of the comb teeth, and in such case, as many additional spines on each tooth will be employed as is necessary to provide support to the flanks of the filter medium pleats.

While reference has been made to employing plastic molded comb members, it will be understood that such comb members may be made of other low cost materials, which lend themselves to multiple fabrication of a large number of such comb members economically. Similarly, while polystyrene foam frame members have been referred to, it will appear that other materials may be employed that may be susceptible of providing suitable rigidity and low cost, as well as economical assembly.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

An air filter comprising a rigid rectangular open frame having an upstream and downstream end and having side and top and bottom members formed of light weight nonmetallic rigid slabs, an elongated rectangular sheet of filter medium having ends and side edges formed in a multiplicity of pleats comprising folds and intermediate flank portions disposed within said frame and having its ends adhesively secured to opposed side frame members and its pleat edges adhesively secured to the top and bottom frame members, a plurality of individual support combs disposed within said frame in uniformly spaced apart parallel relation with respect to each other and parallel with said top and bottom members, said combs having a back bone portion extending from side member to side member and a plurality of like teeth of tapering configuration and uniformly spaced apart and conforming to and projecting into the downstream side of each of said pleats, substantially to the upstream fold, and engaging the flank portions thereof intermediate the folds thereof, said teeth having a plurality of integral oppositely projecting spaced apart light weight spines each of a length less than one half the spacing between adjacent combs all of the same length and having free ends and extending perpendicularly to the plane of the comb and teeth thereof, from adjacent the edges of each tooth to provide support for the flanks of said medium between adjacent comb teeth, and a support rod extending from the top to the bottom member of said casing and lying within each of the upstream folds, and secured to the ends of each of the teeth extending into each of said upstream folds, said rods having pointed ends projecting into and embedded in the top and bottom members of said frame, the backbone of each of said combs having an open resilient recess having a slit, said resilient recess and slit being disposed in the opposite side of said backbone from said teeth, said resilient recess and slit being disposed substantially centrally of the length of said backbone, a brace rod extending from top member to bottom member and affixed to said top member and said bottom member and said brace rod disposed in said recess in the backbone of each comb, said combs having at the opposite ends of the backbone thereof projecting into and embedded in the side members of said frame.

References Cited by the Examiner

UNITED STATES PATENTS

| | | | |
|---|---|---|---|
| 271,733 | 2/1883 | Patee et al. | 248—49 XR |
| 332,383 | 12/1885 | Cole et al. | 248—49 XR |
| 557,733 | 4/1896 | Walker. | |
| 609,455 | 8/1898 | McClafferty. | |
| 1,049,789 | 1/1913 | Williamson | 55—500 XR |
| 1,500,128 | 7/1924 | Harrison | 55—500 XR |
| 1,830,096 | 11/1931 | Dollinger | 55—500 |
| 1,899,007 | 2/1933 | Birkholz | 55—500 |
| 1,959,633 | 5/1934 | Madden | 248—49 XR |
| 2,050,508 | 8/1936 | Strindberg | 55—500 XR |
| 2,058,669 | 10/1936 | Dollinger | 55—521 |
| 2,062,649 | 12/1936 | Hogan | 55—493 XR |
| 2,071,806 | 2/1937 | Walker | 55—499 |
| 2,080,154 | 5/1937 | Strindberg | 55—500 |
| 2,196,839 | 4/1940 | Seng | 55—500 XR |
| 2,247,326 | 6/1941 | Ziemann | 55—496 |
| 2,502,560 | 4/1950 | Dahlman | 55—500 XR |
| 2,681,155 | 6/1954 | Graham | 55—132 |
| 2,739,667 | 3/1956 | Palmore | 55—529 |
| 2,814,355 | 11/1957 | Powers | 55—132 |
| 2,818,134 | 12/1957 | Powers | 55—132 |
| 2,864,460 | 12/1958 | Powers | 55—132 |
| 2,888,092 | 5/1959 | Powers | 55—521 XR |
| 2,907,408 | 10/1959 | Engle et al. | 55—500 |
| 2,915,426 | 12/1959 | Poelman | 55—521 XR |
| 2,943,700 | 7/1960 | Bub | 55—521 XR |
| 3,026,967 | 3/1962 | Stevens et al. | 55—500 |

FOREIGN PATENTS 781,194   8/1957   Great Britain.

HARRY B. THORNTON, *Primary Examiner.*
ROBERT F. BURNETT, *Examiner.*